US012523385B2

(12) United States Patent
Gong et al.

(10) Patent No.: US 12,523,385 B2
(45) Date of Patent: Jan. 13, 2026

(54) AIR CONDITIONER MONITORING SYSTEM AND AIR CONDITIONER

(71) Applicant: QINGDAO HISENSE HITACHI AIR-CONDITIONING SYSTEMS CO., LTD., Shandong (CN)

(72) Inventors: Huayao Gong, Shandong (CN); Weilong Wu, Shandong (CN); Kai Sheng, Shandong (CN)

(73) Assignee: QINGDAO HISENSE HITACHI AIR-CONDITIONING SYSTEMS CO., LTD., Qingdao (CN)

( * ) Notice: Subject to any disclaimer, the term of this patent is extended or adjusted under 35 U.S.C. 154(b) by 414 days.

(21) Appl. No.: 18/139,256

(22) Filed: Apr. 25, 2023

(65) Prior Publication Data

US 2023/0266031 A1 Aug. 24, 2023

Related U.S. Application Data

(63) Continuation of application No. PCT/CN2021/120601, filed on Sep. 26, 2021.

(30) Foreign Application Priority Data

Nov. 27, 2020 (CN) .......................... 202011357281.8

(51) Int. Cl.
*F24F 11/58* (2018.01)
*F24F 11/38* (2018.01)
(Continued)

(52) U.S. Cl.
CPC .............. *F24F 11/58* (2018.01); *F24F 11/38* (2018.01); *F24F 11/63* (2018.01); *F24F 11/52* (2018.01)

(58) Field of Classification Search
CPC .. F24F 11/58; F24F 11/38; F24F 11/63; F24F 11/52
See application file for complete search history.

(56) References Cited

U.S. PATENT DOCUMENTS

2014/0297208 A1* 10/2014 Arensmeier ............. F24F 11/63
702/58
2014/0308043 A1* 10/2014 Heidler ................ H04B 10/808
700/297

(Continued)

FOREIGN PATENT DOCUMENTS

| CN | 200943930 Y | 9/2007 |
| CN | 200975766 Y | 11/2007 |

(Continued)

OTHER PUBLICATIONS

Chinese First Office Action dated Apr. 1, 2025 in corresponding Chinese Application No. 202180032247.X, translated, 14 pages.

(Continued)

*Primary Examiner* — Michael W Choi
(74) *Attorney, Agent, or Firm* — MH2 TECHNOLOGY LAW GROUP LLP

(57) ABSTRACT

An air conditioner monitoring system includes a cloud monitoring platform, a local monitoring platform, and a converter. The converter is configured to collect communication data and includes a first port, a communication assembly, a power supply device, and a second port. The first port is coupled to the local monitoring platform. The communication assembly is coupled to the cloud monitoring platform. The second port is coupled to the power supply device. The converter is configured to transmit the communication data to the local monitoring platform through the first port and transmit the communication data to the cloud monitoring platform through the communication assembly.

(Continued)

The local monitoring platform is configured to parse the communication data and output parsed communication data.

19 Claims, 1 Drawing Sheet

(51) Int. Cl.
 *F24F 11/63* (2018.01)
 *F24F 11/52* (2018.01)

(56) References Cited

U.S. PATENT DOCUMENTS

| | | | | |
|---|---|---|---|---|
| 2016/0025369 | A1* | 1/2016 | Lim | F24F 11/30 |
| | | | | 236/1 C |
| 2020/0133219 | A1* | 4/2020 | Ishizaka | F24F 11/63 |
| 2020/0327080 | A1 | 10/2020 | Sunwoo | |
| 2020/0366517 | A1* | 11/2020 | Ray | H04L 12/2816 |
| 2023/0266031 | A1 | 8/2023 | Gong et al. | |

FOREIGN PATENT DOCUMENTS

| | | | |
|---|---|---|---|
| CN | 101246463 | A | 8/2008 |
| CN | 101435643 | A | 5/2009 |
| CN | 101707315 | A | 5/2010 |
| CN | 102162665 | A | 8/2011 |
| CN | 201965622 | U | 9/2011 |
| CN | 102798198 | A | 11/2012 |
| CN | 202632303 | U | 12/2012 |
| CN | 102901190 | A | 1/2013 |
| CN | 203012470 | U | 6/2013 |
| CN | 203014843 | U | 6/2013 |
| CN | 103187088 | A | 7/2013 |
| CN | 203071976 | U | 7/2013 |
| CN | 203706202 | U | 7/2014 |
| CN | 204679812 | U | 9/2015 |
| CN | 105005215 | A | 10/2015 |
| CN | 105135605 | A | 12/2015 |
| CN | 204853837 | U | 12/2015 |
| CN | 205427591 | U | 8/2016 |
| CN | 207162863 | U | 3/2018 |
| CN | 207422558 | U | 5/2018 |
| CN | 108180601 | A | 6/2018 |
| CN | 108363336 | A | 8/2018 |
| CN | 207963056 | U | 10/2018 |
| CN | 109104434 | A | 12/2018 |
| CN | 208735843 | U | 4/2019 |
| CN | 110012099 | A | 7/2019 |
| CN | 110594949 | A | 12/2019 |
| CN | 210273546 | U | 4/2020 |
| CN | 210327637 | U | 4/2020 |
| CN | 210627477 | U | 5/2020 |
| CN | 112393381 | A | 2/2021 |

OTHER PUBLICATIONS

International Search Report and Written Opinion dated Nov. 29, 2021 in corresponding International Application No. PCT/CN2021/120601, translated, 20 pages.
Chinese First Office Action dated Aug. 30, 2021 in corresponding Chinese Application No. 202011357281.8, translated, 19 pages.
Chinese Second Office Action dated Mar. 15, 2022 in corresponding Chinese Application No. 202011357281.8, translated, 7 pages.
Chinese Notification to Grant Patent Right dated May 5, 2022 in corresponding Chinese Application No. 202011357281.8, translated, 8 pages.

\* cited by examiner

AIR CONDITIONER MONITORING SYSTEM AND AIR CONDITIONER

CROSS-REFERENCE TO RELATED APPLICATIONS

This application is a continuation application of International Application No. PCT/CN2021/120601, filed on Sep. 26, 2021, which claims priority to Chinese Patent Application No. 202011357281.8, filed on Nov. 27, 2020, which are incorporated herein by reference in their entireties.

TECHNICAL FIELD

The present disclosure relates to the field of air conditioning technologies, and in particular, to an air conditioner monitoring system and an air conditioner.

BACKGROUND

With the development of intelligent level of air conditioners, a demand for intelligent monitoring and remote fault diagnosis of an indoor unit and an outdoor unit of the conditioner is becoming increasingly strong.

SUMMARY

In an aspect, an air conditioner monitoring system includes a cloud monitoring platform, a local monitoring platform, and a converter. The converter is configured to collect communication data and includes a first port, a communication assembly, a power supply device, and a second port. The first port is coupled to the local monitoring platform. The communication assembly is coupled to the cloud monitoring platform. The second port is coupled to the power supply device. The converter is further configured to transmit the communication data to the local monitoring platform through the first port. The local monitoring platform is configured to parse the communication data and output parsed communication data and output a first control instruction or a second control instruction to the converter. The converter is further configured to transmit the communication data to the cloud monitoring platform through the communication assembly. The cloud monitoring platform is configured to output a third control instruction or a fourth control instruction to the converter.

In another aspect, an air conditioner is provided, and the air conditioner includes at least one indoor unit, an outdoor unit, an air conditioner communication bus coupled to the at least one indoor unit and the outdoor unit, and the air conditioner monitoring system as described above. The converter of the air conditioner monitoring system is coupled to the air conditioner communication bus and configured to collect the communication data between the at least one indoor unit and the outdoor unit.

BRIEF DESCRIPTION OF THE DRAWINGS

In order to describe the technical solutions of the embodiments of the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams and are not limitations on an actual size of a product, an actual process of a method, and an actual timing of a signal to which the embodiments of the present disclosure relate.

DETAILED DESCRIPTION

Figure 1:
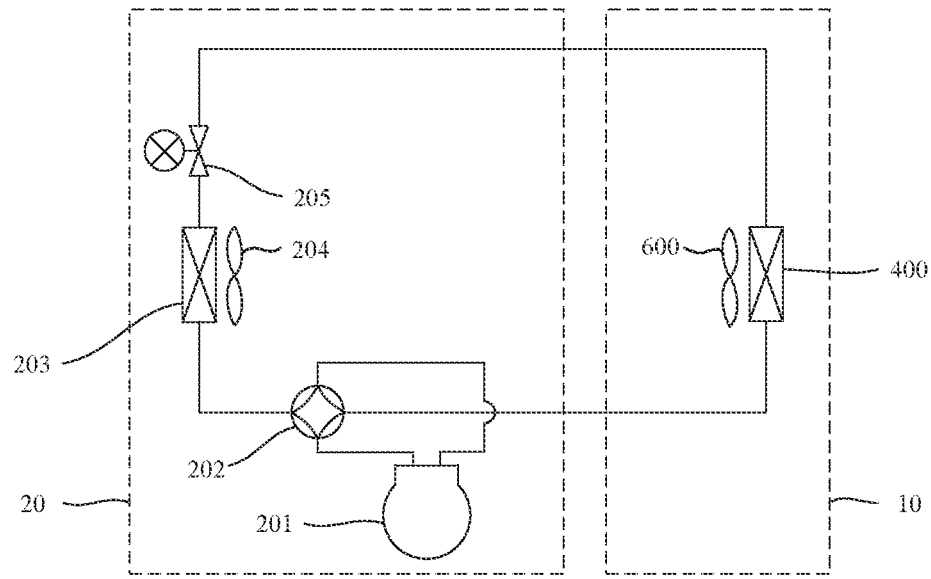
FIG. 1 is a schematic diagram of an air conditioner, in accordance with some embodiments.

The technical solutions in some embodiments of the present disclosure will be described clearly and completely with reference to the accompanying drawings below. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes and cannot be construed as indicating or implying the relative importance or implicitly indicating the number of indicated technical features. Thus, a feature defined with "first" or "second" may explicitly or implicitly include one or more features. In the description of the embodiments of the present disclosure, terms "a plurality of," "the plurality of," and "multiple" each mean two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other but still cooperate or interact with each other. The embodiments disclosed herein are not necessarily limited to the content herein.

The phrase "at least one of A, B, and C" has a same meaning as the phrase "at least one of A, B, or C," and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

The use of "applicable to" or "configured to" herein indicates an open and inclusive expression, which does not exclude devices that are applicable to or configured to perform additional tasks or steps.

The term "about," "substantially," or "approximately" as used herein includes a stated value and an average value within an acceptable range of deviation of a particular value. The acceptable range of deviation is determined by a person of ordinary skill in the art in consideration of measurement in question and errors associated with measurement of a particular quantity (i.e., limitations of a measurement system).

As used herein, a term such as "parallel," "perpendicular," or "equal" includes a stated condition and a condition similar to the stated condition. The range of the similar condition is within an acceptable range of deviation. The acceptable range of deviation is determined by a person of ordinary skill in the art in consideration of the measurement in question and errors associated with the measurement of a specific quantity (i.e., the limitation of the measurement system). For example, the term "parallel" includes absolute parallelism and approximate parallelism, and an acceptable range of deviation of the approximate parallelism may be a deviation within 5°; the term "perpendicular" includes absolute perpendicularity and approximate perpendicularity, and an acceptable range of deviation of the approximate perpendicularity may also be a deviation within 5°; and the term "equal" includes absolute equality and approximate equality, and an acceptable range of deviation of the approximate equality may be a difference between two equals being less than or equal to 5% of either of the two equals.

Some embodiments of the present disclosure provide an air conditioner.

As shown in FIG. 1, the air conditioner 1000 includes an indoor unit 10 and an outdoor unit 20. The indoor unit 10 and the outdoor unit 20 are connected by a pipe to convey refrigerant. The indoor unit 10 includes an indoor heat exchanger 400 and an indoor fan 600. The outdoor unit 20 includes a compressor 201, a four-way valve 202, an outdoor heat exchanger 203, an outdoor fan 204, and an expansion valve 205. The compressor 201, the outdoor heat exchanger 203, the expansion valve 205, and the indoor heat exchanger 400 that are connected in sequence form a refrigerant loop. The refrigerant circulates in the refrigerant loop and exchanges heat with air through the outdoor heat exchanger 203 and the indoor heat exchanger 400, so as to implement a cooling mode or a heating mode of the air conditioner 1000.

The compressor 201 is configured to compress the refrigerant, so that a low-pressure refrigerant is compressed to be a high-pressure refrigerant.

The outdoor heat exchanger 203 is configured to perform heat exchange between outdoor air and the refrigerant conveyed in the outdoor heat exchanger 203. For example, the outdoor heat exchanger 203 operates as a condenser in the cooling mode of the air conditioner 1000, so that the refrigerant compressed by the compressor 201 dissipates heat into the outdoor air through the outdoor heat exchanger 203 to be condensed; and the outdoor heat exchanger 203 operates as an evaporator in the heating mode of the air conditioner 1000, so that the decompressed refrigerant absorbs heat from the outdoor air through the outdoor heat exchanger 203 to be evaporated.

In some embodiments, the outdoor heat exchanger 203 further includes heat exchange fins, so as to enlarge a contact area between the outdoor air and the refrigerant conveyed in the outdoor heat exchanger 203, thereby improving heat exchange efficiency between the outdoor air and the refrigerant.

The outdoor fan 204 is configured to suck the outdoor air into the outdoor unit 20 through an outdoor air inlet of the outdoor unit 20, and send the outdoor air, after heat-exchange between the outdoor air and the outdoor heat exchanger 203, out through an outdoor air outlet of the outdoor unit 20. The outdoor fan 204 provides power for the flow of the outdoor air.

The expansion valve 205 is connected between the outdoor heat exchanger 203 and the indoor heat exchanger 400. The pressure of the refrigerant flowing through the outdoor heat exchanger 203 and the indoor heat exchanger 400 is adjusted by an opening degree of the expansion valve 205, so as to adjust the flow of the refrigerant flowing through the outdoor heat exchanger 203 and indoor heat exchanger 400. The flow and the pressure of the refrigerant flowing between the outdoor heat exchanger 203 and the indoor heat exchanger 400 will affect a heat exchange performance of the outdoor heat exchanger 203 and the indoor heat exchanger 400. The expansion valve 205 may be an electronic valve. The opening degree of the expansion valve 205 is adjustable, so as to control the flow and the pressure of refrigerant flowing through the expansion valve 205.

The four-way valve 202 is connected in the refrigerant loop. The four-way valve 202 is configured to switch a flow direction of the refrigerant in the refrigerant loop, so as to cause the air conditioner 1000 to perform the cooling mode or the heating mode.

The indoor heat exchanger 400 is configured to perform heat exchange between indoor air and refrigerant conveyed in the indoor heat exchanger 400. For example, the indoor heat exchanger 400 operates as an evaporator in the cooling mode of the air conditioner 1000, so that the refrigerant, that has dissipated heat through the outdoor heat exchanger 203, absorbs heat from the indoor air through the indoor heat exchanger 400 to be evaporated; and the indoor heat exchanger 400 operates as a condenser in the heating mode of the air conditioner 1000, so that the refrigerant, that has absorbed heat through the outdoor heat exchanger 203, dissipates heat into the indoor air through the indoor heat exchanger 400 to be condensed.

In some embodiments, the indoor heat exchanger 400 further includes heat exchange fins, so as to enlarge a contact area between the indoor air and the refrigerant conveyed in the indoor heat exchanger 400, thereby improving heat exchange efficiency between the indoor air and the refrigerant.

The indoor fan 600 is configured to suck the indoor air into the indoor unit 10 through an indoor air inlet of the indoor unit 10, and send the indoor air, after heat-exchange between the indoor air and the indoor heat exchanger 400, out through an indoor air outlet of the indoor unit 10. The indoor fan 600 provides power for the flow of the indoor air.

The indoor unit 10 and outdoor unit 20 are communicatively connected through an air conditioner communication bus, such as a home bus system (HBS).

In order to achieve intelligent monitoring and remote fault diagnosis of the air conditioner, the air conditioner 1000 further includes an air conditioner monitoring system. The air conditioner monitoring system is connected to the air conditioner communication bus through a converter, so as to obtain communication data of the indoor unit 10 and the outdoor unit 20 and upload the communication data to a local monitoring platform or a remote monitoring platform.

Usually, the local monitoring platform and the remote monitoring platform need to be connected to the air conditioner communication bus through different types of converters, which makes the wiring layout complicated. In some cases where maintenance and repair needs of the air conditioner 1000 may be met using the local monitoring manner in daily, and the remote monitoring manner is used infrequently, it is prone to causing resource waste.

For convenience of use, some embodiments of the present disclosure use a single converter to achieve the local monitoring and the remote monitoring of the air conditioner. The converter may not only connect to the local monitoring platform (e.g., a local monitoring computer) to directly upload the obtained air conditioning operation data to the local monitoring computer, but also establish remote communication with the remote monitoring platform to send the obtained air conditioning operation data to a cloud server (including a computer cluster connected to a network). In addition, the converter may further output control instructions of the local monitoring platform or the remote monitoring platform to the indoor unit 10 and outdoor unit 20.

In this way, by combining the local monitoring and the remote monitoring, a location of fault may be quickly identified and a cause of the fault may be analyzed based on the air conditioning operation data reported by the converter 1, thereby improving after-sales efficiency of the air conditioner and saving after-sales costs of the air conditioner.

In some embodiments of the present disclosure, the air conditioner includes an outdoor unit 20 and at least one indoor unit 10 that communicates with the outdoor unit 20.

Figure 2:
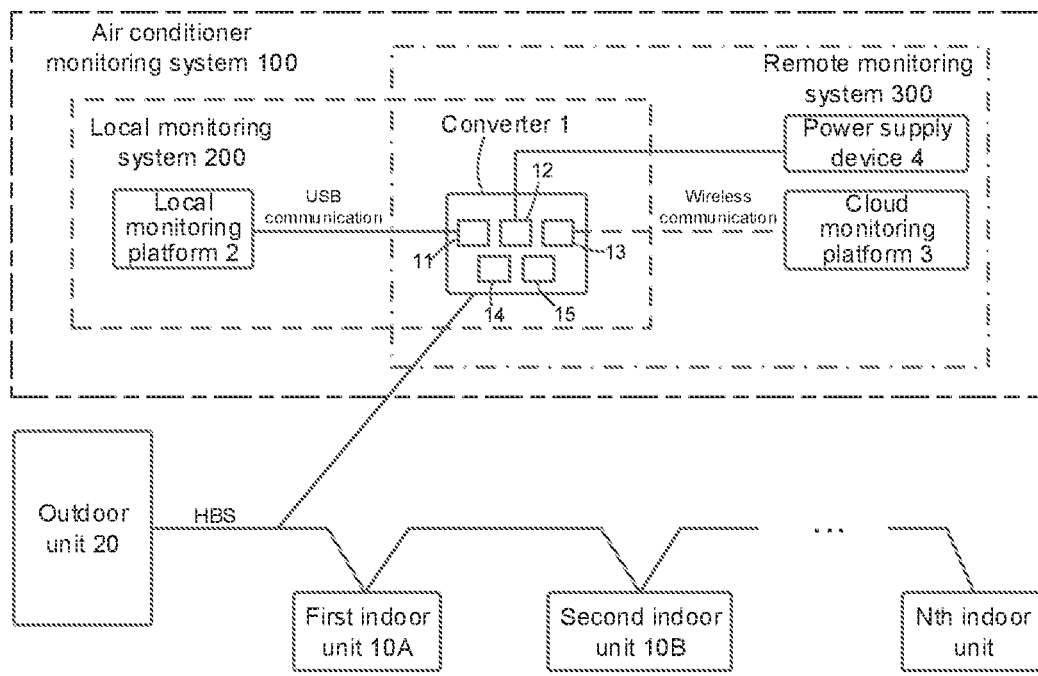
FIG. 2 is a block diagram of an air conditioner including an air conditioner monitoring system, in accordance with some embodiments.

The air conditioner will be described by considering a multi-connected air conditioner as an example below. As shown in FIG. 2, the at least one indoor unit 10 includes a first indoor unit 10A and a second indoor unit 10B, and the like.

As shown in FIG. 2, the multi-connected air conditioner further includes an air conditioner monitoring system 100. The air conditioner monitoring system 100 includes a local monitoring system 200 and a remote monitoring system 300. The local monitoring system 200 includes a local monitoring platform 2. For example, the local monitoring platform 2 is a personal computer (PC). The remote monitoring system 300 includes a cloud monitoring platform 3. For example, the cloud monitoring platform 3 includes a computer cluster connected to a network. The multi-connected air conditioner further includes a converter 1. The converter 1 and the local monitoring platform 2 constitute the local monitoring system 200, and the converter 1 and the cloud monitoring platform 3 constitute the remote monitoring system 300. The converter 1 is configured to collect operating parameters of the indoor units 10 and the outdoor unit 20 and output control instructions to the indoor units 10 and the outdoor unit 20.

In order to implement the local monitoring through the converter 1, as shown in FIG. 2, the converter 1 includes a first port 11. For example, the first port 11 is a universal serial bus (USB) port (e.g., a USE Type-C port). The first port 11 is communicatively connected to the local monitoring platform 2 (e.g., the PC). The local monitoring platform 2 supplies power to the converter 1 through the first port 11 and achieves USE communication between the converter 1 and the local monitoring platform 2 through the first port 11. The following will be described by considering an example where the first port 11 is a USB port, but it should be understood that the type of the first port is not limited thereto.

In order to implement the remote monitoring through the converter 1, as shown in FIG. 2, the converter 1 further includes a communication assembly 13. The communication assembly 13 is, for example, a wireless network communication assembly, such as a Wireless-Fidelity (Wi-Fi) assembly or a local area network (LAN) assembly. The communication assembly 13 is coupled to the cloud monitoring platform 3. The communication assembly 13 has a wireless communication function, and the converter 1 may implement wireless communication with the cloud monitoring platform 3 through the communication assembly 13. For example, the converter 1 implements the wireless communication with the cloud monitoring platform 3 through the Wi-Fi or the LAN.

In some embodiments, the converter 1 further includes a controller 14. For example, the controller 14 is a microcontroller unit (MCU). The controller 14 is configured to process the collected operating parameters of the indoor units 10 and the outdoor unit 20 to upload to the local monitoring platform 2 or the cloud monitoring platform 3 and process the received control instructions to output to the indoor units 10 and the outdoor unit 20.

A peak power consumption required for the converter to communicate through the first port is less than a power parameter of the converter. A peak power consumption required for the converter to communicate through the second port is less than a power parameter of the converter. Moreover, a sum of a peak power consumption required for the converter to communicate through the first port and a peak power consumption required for the converter to communicate through the second port is greater than a power parameter of the converter. For example, the electric power obtained by the converter 1 needs to support operation of the controller 14 (e.g., the MCU) and operation of one of the USB communication and the Wi-Fi/LAN (i.e., Wi-Fi or LAN) communication. According to a USB 2.0 technical specification, a power parameter that may be received by the converter 1 through the USB port is 5V and 500 mA, that is, the converter 1 may only obtain no more than 500 mA@aj5V of electrical energy from an external device (e.g., a PC).

A sum of peak power consumptions required for the operation of both the MCU and the USB communication of the converter 1 is less than 500 mA@5V. A sum of peak power consumptions required for the operation of both the MCU and the Wi-Fi/LAN communication of the converter 1 is also less than 500 mA@5V. A sum of peak power consumptions required for simultaneous operation of the MCU, the USB communication, and the Wi-Fi/LAN communication of the converter 1 is greater than 500 mA@5V.

Therefore, when the converter 1 is powered through the first port 11, the electric power is not capable of supporting the simultaneous operation of the USB communication and the Wi-Fi/LAN communication. The converter 1 needs to switch between using the USB communication function and using the wireless communication function.

In some embodiments, the converter 1 further includes a second port 12. For example, the second port 12 is a USB port (e.g., a USB Type-C port). The air conditioner monitoring system 100 further includes a power supply device 4. For example, the power supply device 4 is a USB power adapter or a mobile power supply that is connected to a power source (e.g., mains electricity). The second port 12 is coupled to the power supply device 4. When the converter 1 uses the wireless communication function, the power supply device 4 supplies power to the converter 1 from the second port 12 through a USB cable.

Therefore, by switching between using the first port 11 and using the second port 12, the converter 1 may be supplied with power during the USB communication or the wireless communication, respectively.

During use, either the first port 11 or the second port 12 is used. That is, the second port 12 is idle when the first port 11 is used, and the first port 11 is idle when the second port 12 is used.

In some embodiments, the controller 14 is further configured to control the converter 1 to stop operating when both the first port 11 and the second port 12 are used simultaneously. In this way, it is possible to ensure a stability of the converter 1 during operation.

In some embodiments, the controller 14 is further configured to control the communication assembly 13 of the converter 1 to stop operating when the converter 1 communicates with the local monitoring platform 2 through the first port 11.

For example, the first port 11 is connected to the local monitoring platform 2, and the second port 12 is idle. The local monitoring platform 2 supplies power to the converter 1 through the first port 11 and communicates with the converter 1 through the first port 11. In this case, the wireless communication function of the converter 1 is disabled, that is, the converter 1 will not communicate with the cloud monitoring platform 3 through the communication assembly.

The second port 12 is connected to the power supply device 4, and the first port 11 is idle. The power supply device 4 supplies power to the converter 1 through the second port 12, and the wireless communication function of the converter 1 is enabled. Since the first port 11 is not used, the USB communication function of the converter 1 is disabled at this time.

In some embodiments, the converter 1 further includes a power management device 15. For example, the power management device 15 is a power multiplexing chip, and the power management device 15 is configured to seamlessly switch between a power input of the first port 11 and a power input of the second port 12.

In a case where the first port 11 is inserted into the local monitoring platform 2 (and the second port 12 is not inserted the power supply device 4 at this time), the power input is switched to a 5V power supply of the first port 11, so as to cause the MCU and the USB communication of the converter 1 to operate.

In a case where the second port 12 is inserted into the power supply device 4 (and the first port 11 is not inserted the local monitoring platform 2 at this time), the power input is switched to a 5V power supply of the second port 12, so as to cause the MCU and the WiFi/LAN communication of the converter 1 to operate.

The operating modes of the converter 1 include a stop mode, a code capturing mode, and a centralized control mode.

In a case where the converter 1 is in the stop mode, the converter 1 does not operate and does not perform any actions.

In a case where the converter 1 is in the code capturing mode, the converter 1 passively receives all communication data between the indoor units and the outdoor unit and will not output any data to the air conditioner communication bus. Only after passively receiving all the communication data, the converter 1 outputs all the communication data to the local monitoring platform 2 when using the first port 11, or outputs all the communication data to the cloud monitoring platform 3 when using the second port 12.

In a case where the converter 1 is in the centralized control mode, the converter 1 will actively output data feedback signals to the indoor units 10 and the outdoor unit 20 to request the indoor units 10 and the outdoor unit 20 to feed current operating parameters back and output the received control instructions to the indoor units 10 and the outdoor unit 20 to control operating status of the indoor units 10 and the outdoor unit 20.

When using the first port 11 instead of the second port 12, the converter 1 switches to the 5V power supply of the first port 11. The MCU, the USB communication, and other basic peripherals of the converter 1 operate, and the WiFi/LAN function is disabled. In this case, the converter 1 only forms the local monitoring system with the local monitoring platform 2.

In a case where the converter 1 operates normally (i.e., the converter 1 has not received a control instruction), the converter 1 is in the code capturing mode and passively receives all the communication data between the indoor units 10 and the outdoor unit 20 from the air conditioner communication bus.

The local monitoring platform 2 may output a first control instruction to the converter 1. The first control instruction triggers the converter 1 to switch from the code capturing mode to the centralized control mode and makes the converter 1 actively output the data feedback signals to the indoor units 10 and the outdoor unit 20 through the air conditioner communication bus.

After receiving the data feedback signals, the indoor units 10 and the outdoor unit 20 may feed the communication data containing relevant operating parameters back to the converter 1 through the air conditioner communication bus according to the data feedback signals. Afterwards, the converter 1 outputs the communication data to the local monitoring platform 2 through the USE communication.

In order to ensure reliable transmission of the communication data, the converter 1 encrypts the communication data with USB encryption at the first port 11 to obtain USB encrypted communication data and then outputs the USB encrypted communication data to the local monitoring platform 2.

After the USB encrypted communication data is transmitted to a USB port of the local monitoring platform 2, the local monitoring platform 2 decrypts the USE encrypted communication data to form communication data in plaintext.

Afterwards, the local monitoring platform 2 calls an internal dynamic database to parse the communication data in plaintext and maps the communication data in plaintext to parameter parsing tables of the indoor units 10 and the outdoor unit 20. In this case, the operating parameters of the indoor units 10 and the outdoor unit 20 may be obtained based on the respective parameter parsing tables of the indoor units 10 and the outdoor unit 20.

The local monitoring platform 2 outputs the operating parameters of the indoor units 10 and the outdoor unit 20. For example, the operating parameters of the indoor units 10 and the outdoor unit 20 are visually displayed on a main interface of the local monitoring platform 2. In this way, it is convenient for users to visually view the operating status of the indoor units 10 and the outdoor unit 20, thereby achieving local real-time monitoring of the indoor units 10 and the outdoor unit 20.

Of course, the local monitoring platform 2 may also output the operating parameters of the indoor units 10 and the outdoor unit 20 in text.

The communication data between the indoor units 10 and the outdoor unit 20 may be directly transmitted to the local monitoring platform 2 only through the converter 1. It may be possible to shorten a transmission process of the communication data, reduce an interference of other factors on the communication data during the transmission process, and maintain stability of the transmission of the communication data and reliability of the communication data. In addition, the analysis and processing of the USB encrypted communication data outputted by the converter 1 are carried out by the local monitoring platform 2, for example, by a processor of the PC. In this way, the local monitoring platform 2 has a fast processing speed, thereby improving processing efficiency and achieving efficient local monitoring.

In some embodiments, the local monitoring platform 2 may output a second control instruction to the converter 1 according to a proprietary protocol, and the MCU of the converter 1 processes the second control instruction to control the operation of the indoor units and the outdoor unit, thereby implementing local monitoring of the indoor units 10 and the outdoor unit 20.

Therefore, the control instructions output by the local monitoring platform 2 include the first control instruction used to trigger the converter 1 to switch from the code capturing mode to the centralized control mode and the second control instruction output to the converter 1 and processed by the MCU of the converter 1 to control the operation of the indoor units and the outdoor unit.

When using the second port 12 instead of the first port 11, the converter 1 switches to the 5V power supply of the second port 12. The MCU, the WiFi/LAN communication, and other basic peripherals of the converter 1 operate, and the USB communication function is disabled. In this case, the converter 1 only forms the remote monitoring system with the cloud monitoring platform 3.

When the converter 1 operates normally (i.e., the converter 1 has not received a control instruction), the converter 1 is in the code capturing mode and passively receives all the communication data between the indoor units 10 and the outdoor unit 20 from the air conditioner communication bus.

The communication assembly 13 uploads all the communication data to the cloud monitoring platform 3. The cloud monitoring platform 3 analyzes and processes all the communication data, and the operation parameters of the indoor units 10 and the outdoor unit 20 obtained after analysis and processing are displayed on a control interface of the cloud monitoring platform 3, thereby achieving the remote monitoring of the operating status of the indoor units 10 and the outdoor unit 20.

The cloud monitoring platform 3 may output a third control instruction to the converter 1 through the communication assembly 13, so as to trigger the converter 1 to switch from the code capturing mode to the centralized control mode and make the converter 1 actively output the data feedback signals to the indoor units 10 and the outdoor unit 20 through the air conditioner communication bus.

After receiving the data feedback signals, the indoor units 10 and the outdoor unit 20 may feed the communication data containing the relevant operating parameters back to the converter 1 through the air conditioner communication bus according to the data feedback signals. Afterwards, the converter 1 outputs the communication data to the cloud monitoring platform 3 through the wireless communication, thereby achieving remote real-time monitoring of the indoor units 10 and the outdoor unit 20.

The cloud monitoring platform 3 may also output a fourth control instruction to the converter 1. The MCU of the converter 1 processes the fourth control instruction to control the operation of the indoor units 10 and the outdoor unit 20, so as to change the operation status of the indoor units 10 and the outdoor unit 20, thereby achieving the remote control of the indoor units 10 and the outdoor unit 20.

The cloud monitoring platform 3 has a control backend and the control interface. The control backend is used to receive communication data reported by the converter 1 and perform logical analysis and processing on the reported communication data. The control interface is, for example, a web control interface. The analyzed and processed communication data may be visually output on a main interface of the web control interface. In this way, it is convenient for users to visually view the operating parameters of the indoor units 10 and the outdoor unit 20, thereby achieving the remote real-time monitoring of the indoor units 10 and the outdoor unit 20. In addition, the cloud monitoring platform 3 may further output the third control instruction or the fourth control instruction to the converter 1 through the web control interface.

Therefore, the control instructions output by the cloud monitoring platform 3 include the third control instruction used to trigger the converter 1 to switch from the code capturing mode to the centralized control mode and the fourth control instruction output to the converter 1 and processed by the MCU of the converter 1 to control the operation of the indoor units 10 and the outdoor unit 20.

On the web control interface, users with different user levels have different access to cloud resources and also have not exactly the same control permissions.

For example, when a user signs up for an account on the web control interface, a background of the cloud monitoring platform 3 will automatically recognize the user level and activate the account based on the account registration information filled in by the user, so as to make the account effective.

When the user accesses a web login interface through a public network and inputs the account and a password, the user is allowed to enter the web control interface. The background of the cloud monitoring platform 3 will feed back detection data that can be obtained within the user's permission range to the user. Therefore, the user may view the operating parameters of the indoor units 10 and the outdoor unit 20 within the relevant permission range.

For example, the operating parameters of the indoor units 10 and the outdoor unit 20 include a frequency and a real-time current value of the compressor.

It will be understood that the users with different user levels have different permissions, which may improve the intelligence of the air conditioner monitoring system and improve the convenience for the users to use the air conditioner monitoring system.

The permissions include at least a query permission and a control permission.

For example, the permissions of users may be divided into three levels, such as a first-level permission, a second-level permission, and a third-level permission.

A user with the first-level permission has a right to view all engineering projects. For example, taking a converter 1 as a unit, the user with the first-level permission may query the operating parameters of the indoor units 10 and the outdoor unit 20 connected to each converter 1. However, the user with the first-level permission has only the query permission, but not the control permission.

A user with the second-level permission may only monitor the engineering project installed by himself. For example, the user with the second-level permission may monitor real-time operation status of the indoor units 10 and the outdoor unit 20 of the air conditioner under the engineering project, so as to timely find the cause of stopping operating or fault of the indoor units 10 and the outdoor unit 20. The user with the second-level permission has only the query permission, but not the control permission.

A user with the third-level permission may be a direct project manager of an engineering project. The user with the third-level permission may view the operating parameters of all of indoor units 10 and outdoor units 20 under his own engineering project(s) and simultaneously have the control permissions.

If the user with the third-level permission has a plurality of engineering projects, the user may further set a plurality of project leader accounts. Each project leader account may view the operating parameters of the indoor units 10 and the outdoor unit 20 under his own engineering project and control the operation of the indoor units 10 and the outdoor unit 20 under his own engineering project.

It will be noted that the engineering project described in the embodiments of the present disclosure refers to the indoor units 10 and the outdoor unit 20 connected to a single converter 1.

Of course, there may be a plurality of engineering projects respectively corresponding to a plurality of converters communicating with the cloud monitoring platform 3. In this case, the plurality of converters in use should be numbered, so that the background of the cloud monitoring platform 3 may identify the plurality of converters in use.

The device numbers of all converters are each associated with a respective user account and respective engineering project information, so that a user may easily query the operating parameters of the indoor units 10 and the outdoor unit 20, connected to each converter, of the air conditioner within his permission range and related to the engineering project information after logging in to his account.

The engineering and construction projects or smart home projects may be well served by grading management. The manager may bypass the direct user of the indoor units 10 and the outdoor unit 20 of the air conditioner to view the usage status and the operating parameters of the indoor units 10 and the outdoor units 20 of the air conditioner, which may facilitate intelligent management and remote centralized monitoring of the project.

In addition, the cloud monitoring platform 3 may further make fault warning analysis on the operation status of the indoor units 10 and the outdoor unit 20 based on the operating parameters of the indoor units 10 and the outdoor unit 20 and send out a stop warning before the indoor units 10 and the outdoor unit 20 stop operating due to the fault.

Moreover, the cloud monitoring platform 3 will actively push fault warning information to relevant persons in charge (e.g., the user with the second-level permission and the user with the third-level permission) according to contact information reserved by the relevant persons in charge in a case of setting the project persons in charge, so as to quickly respond to the fault and stop the loss in time.

The cloud monitoring platform 3 may further analyze an energy consumption trend of the indoor units 10 and the outdoor unit 20 according to the actual operation of the indoor units 10 and the outdoor unit 20 and push an analysis result of the energy consumption trend of the indoor units 10 and the outdoor unit 20 to the relevant project persons in charge and give reasonable use suggestions, so as to achieve rather intelligent monitoring of the indoor units 10 and the outdoor unit 20.

A person skilled in the art will understand that, the scope of disclosure in the present disclosure is not limited to specific embodiments discussed above, and some elements of the embodiments may be modified and substituted without departing from the spirits of the present disclosure. The scope of the present disclosure shall be subject to the claims.

What is claimed is:

1. An air conditioner monitoring system, comprising:
   a cloud monitoring platform;
   a local monitoring platform; and
   a converter configured to collect communication data; the converter including:
      a first port coupled to the local monitoring platform;
      a communication assembly coupled to the cloud monitoring platform;
      a power supply device; and
      a second port coupled to the power supply device; wherein
   the converter is further configured to transmit the communication data to the local monitoring platform through the first port; and the local monitoring platform is configured to parse the communication data and output parsed communication data, and the local monitoring platform is further configured to output one of a first control instruction and a second control instruction to the converter; and
   the converter is further configured to transmit the communication data to the cloud monitoring platform through the communication assembly; and the cloud monitoring platform is configured to output one of a third control instruction and a fourth control instruction to the converter;
   wherein the first port is a universal serial bus (USB) port;
   the converter is further configured to encrypt the communication data with USB encryption to obtain USB encrypted communication data and transmit the USB encrypted communication data to the local monitoring platform; and
   the local monitoring platform includes another USB port and a dynamic database, and the local monitoring platform is further configured to decrypt the USB encrypted communication data to obtain communication data in plain text and call the dynamic database to parse the communication data in plaintext to obtain the communication data containing operating parameters.

2. The air conditioner monitoring system according to claim 1, wherein operating modes of the converter include a stop mode; and
   the converter is further configured to stop operating in the stop mode.

3. The air conditioner monitoring system according to claim 2, wherein the operating modes of the converter further include a centralized control mode; and
   the converter is further configured, in the centralized control mode, to actively output data feedback signals, obtain the communication data containing operating parameters fed back based on the data feedback signals, and output a received control instruction from the cloud monitoring platform or the local monitoring platform, wherein the received control instruction includes one of the first control instruction, the second control instruction, the third control instruction, and the fourth control instruction.

4. The air conditioner monitoring system according to claim 3, wherein the operating modes of the converter further includes a code capturing mode; and the converter is further configured to, in the code capturing mode, passively receive all communication data, and transmit all the communication data to the cloud monitoring platform or the local monitoring platform.

5. The air conditioner monitoring system according to claim 4, wherein the local monitoring platform is configured to output the first control instruction to the converter through the first port to trigger the converter to switch from the code capturing mode to the centralized control mode.

6. The air conditioner monitoring system according to claim 4, wherein the cloud monitoring platform is configured to output the third control instruction to the converter through the communication assembly to trigger the converter to switch from the code capturing mode to the centralized control mode.

7. The air conditioner monitoring system according to claim 1, wherein the local monitoring platform includes a main interface, and the local monitoring platform is further configured to output the operating parameters on the main interface visually or in text.

8. The air conditioner monitoring system according to claim 1, wherein the cloud monitoring platform is configured to receive the communication data transmitted by the converter, perform logical analysis and processing on the communication data, and output the fourth control instruction to the converter.

9. The air conditioner monitoring system according to claim 8, wherein the cloud monitoring platform includes a control interface, and the control interface is configured to visually output the communication data.

10. The air conditioner monitoring system according to claim 9, wherein the cloud monitoring platform is further configured to perform grading management in users based on the users' registered accounts, and users with different levels have different permissions for operating the control interface, wherein the permissions include at least a query permission and a control permission.

11. The air conditioner monitoring system according to claim 10, wherein the cloud monitoring platform is further configured to make fault warning analysis based on the communication data containing operating parameters and send out a stop warning.

12. The air conditioner monitoring system according to claim 1, wherein the communication assembly has a wireless communication function, and the converter wirelessly communicates with the cloud monitoring platform through the communication assembly.

13. The air conditioner monitoring system according to claim 1, wherein a peak power consumption required for the converter to communicate through the first port is less than a power parameter of the converter.

14. The air conditioner monitoring system according to claim 1, wherein a peak power consumption required for the converter to communicate through the second port is less than a power parameter of the converter.

15. The air conditioner monitoring system according to claim 1, wherein a sum of a peak power consumption required for the converter to communicate through the first port and a peak power consumption required for the converter to communicate through the second port is greater than a power parameter of the converter.

16. The air conditioner monitoring system according to claim 1, wherein the local monitoring platform is further configured to supply power to the converter through the first port and achieve communication between the converter and the local monitoring platform through the first port.

17. An air conditioner, comprising:
at least one indoor unit;
an outdoor unit;
an air conditioner communication bus coupled to the at least one indoor unit and the outdoor unit; and
the air conditioner monitoring system according to claim 1, wherein the converter of the air conditioner monitoring system is coupled to the air conditioner communication bus and configured to collect the communication data between the at least one indoor unit and the outdoor unit.

18. The air conditioner according to claim 17, wherein the local monitoring platform of the air conditioner monitoring system is configured to output the second control instruction to the converter, so that the converter controls operation of the at least one indoor unit and the outdoor unit based on the second control instruction.

19. The air conditioner according to claim 17, wherein the cloud monitoring platform of the air conditioner monitoring system is configured to output the fourth control instruction to the converter, so that the converter controls operation of at least one the indoor unit and the outdoor unit based on the fourth control instruction.

* * * * *